(12) United States Patent
Furuta (10) Patent No.: US 8,892,593 B2
(45) Date of Patent: Nov. 18, 2014

(54) IN-VEHICLE COMMUNICATION SYSTEM (75) Inventor: Seiichi Furuta, Anjo (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 13/084,598

(22) Filed: Apr. 12, 2011

(65) Prior Publication Data
US 2011/0258221 A1 Oct. 20, 2011

(30) Foreign Application Priority Data

Apr. 14, 2010 (JP) .................................. 2010-93199

(51) Int. Cl.
*G06F 17/30* (2006.01)
*H04W 4/04* (2009.01)

(52) U.S. Cl.
CPC ..................................... *H04W 4/046* (2013.01)
USPC ................... 707/769; 707/E17.014

(58) Field of Classification Search
USPC ........ 701/1, 532, 36, 468, 469, 533; 707/769; 455/66.1, 77, 465.1, 550.1, 562.1, 455/412.1, 414.3, 532; 370/352; 340/903
See application file for complete search history.

(56) References Cited

U.S. PATENT DOCUMENTS

| | | | |
|---|---|---|---|
| 5,218,629 A * | 6/1993 | Dumond, Jr. et al. | 455/412.1 |
| 6,529,826 B2 | 3/2003 | Kawai et al. | |
| 6,636,785 B2 | 10/2003 | Kuroda et al. | |
| 8,117,303 B2 | 2/2012 | Fonsen | |
| 2002/0004704 A1 * | 1/2002 | Nagatsuma et al. | 701/213 |
| 2003/0083807 A1 * | 5/2003 | Kuroda et al. | 701/202 |
| 2005/0171686 A1 * | 8/2005 | Davis | 701/200 |
| 2006/0166656 A1 * | 7/2006 | Klicpera et al. | 455/414.3 |
| 2006/0212177 A1 * | 9/2006 | Furuta | 701/1 |
| 2006/0240781 A1 * | 10/2006 | Tabe | 455/66.1 |
| 2008/0215209 A1 * | 9/2008 | Ikeda et al. | 701/36 |
| 2008/0319653 A1 * | 12/2008 | Moshfeghi | 701/208 |
| 2009/0168760 A1 * | 7/2009 | Katis et al. | 370/352 |
| 2010/0052945 A1 * | 3/2010 | Breed | 340/903 |
| 2010/0234071 A1 * | 9/2010 | Shabtay et al. | 455/562.1 |
| 2010/0291965 A1 * | 11/2010 | Tabe | 455/550.1 |
| 2011/0092170 A1 * | 4/2011 | Kamalski | 455/77 |
| 2011/0258221 A1 * | 10/2011 | Furuta | 707/769 |
| 2011/0263268 A1 * | 10/2011 | Shcherbatyuk | 455/456.1 |

FOREIGN PATENT DOCUMENTS

| | | |
|---|---|---|
| JP | A-11-161899 | 6/1999 |
| JP | A-2000-92227 | 3/2000 |
| JP | A-2001-245053 | 9/2001 |
| JP | A-2005-134350 | 5/2005 |
| JP | A-2006-162282 | 6/2006 |

OTHER PUBLICATIONS

Office Action mailed Jun. 26, 2012 in corresponding JP Application No. 2010-093199 (and English translation).
Office Action dated May 9, 2013 in corresponding CN patent application No. 201110096650.7 (and English translation).
Office Action dated Dec. 13, 2013 in corresponding CN patent application No. 201110096650.7 (and English translation).

* cited by examiner

*Primary Examiner* — Tuan C. To
*Assistant Examiner* — Yuri Kan
(74) *Attorney, Agent, or Firm* — Posz Law Group, PLC (57) ABSTRACT

An in-vehicle communication system is disclosed. In the in-vehicle communication system, when a portable device has received a data request specifying a specific data from an in-vehicle apparatus, the portable device determines whether the portable device can receive the specific data from a center apparatus. When the portable device determines that the portable device cannot receive the specific data from the center apparatus and that the specific data is stored in a data storage area of the portable device, the portable device transmits the specific data stored in the data storage area to the in-vehicle apparatus.

8 Claims, 6 Drawing Sheets

IN-VEHICLE COMMUNICATION SYSTEM

CROSS REFERENCE TO RELATED APPLICATION

The present application is based on and claims priority to Japanese Patent Application No. 2010-93199 filed on Apr. 14, 2010, disclosure of which is incorporated herein by reference.

BACKGROUND OF THE INVENTION

1. Field of the Invention

The present invention relates to an in-vehicle communication system including an in-vehicle apparatus mounted to a vehicle and a portable device capable of being carried by a passenger. The in-vehicle apparatus and the portable device are communicable with each other. The portable device is further communicable with a center apparatus.

2. Description of Related Art

For example, Patent Document 1 discloses an in-vehicle apparatus mounted to a vehicle and configured to connect a communication link with a center apparatus to receive and output data (e.g., content) distributed from the center apparatus.

Patent Document 1: JP-2006-154969A corresponding to US/20060212177A

The inventor of the present application has found out the followings. When the vehicle is within a communication service area (in which the in-vehicle apparatus can communicate with the center apparatus) and within a strong radio signal receivable environment, the in-vehicle apparatus can receive and output the data distributed from the center apparatus. In contrast, when the vehicle is outside the communication service area or when the vehicle is within a poor radio signal environment, the in-vehicle apparatus cannot receive and output the data distributed from the center apparatus. A problem in this case is that a passenger of the vehicle cannot enjoy his or her desired service.

SUMMARY OF THE INVENTION

The present invention is made in view of the foregoing. It is an objective of the present invention to provide an in-vehicle communication system in which an in-vehicle apparatus can receive and output data distributed from a center apparatus and a passenger can enjoy his or her desired service even if a vehicle is outside a communication service area or if a vehicle is within a poor radio signal environment.

According to an aspect of the present invention, an in-vehicle communication system includes an in-vehicle apparatus mounted to a vehicle and a portable device capable of being carried by a passenger. The in-vehicle apparatus and the portable device are configured to be communicable with each other. The portable device is further configured to be communicable with a center apparatus. The portable device includes a data storage area for storing information received from the center apparatus. The portable device is further configured such that when the portable device has received a data request specifying a specific data from the in-vehicle apparatus, the portable device determines whether the portable device can receive, from the center apparatus, a data reply containing the specific data specified by the data request. The portable device is further configured such that when the portable device determines that the portable device cannot receive, from the center apparatus, the data reply containing the specific data specified by the data request, and when the portable device determines that the specific data specified by the data request is stored in the data storage area of the portable device, the portable device transmits the specific data stored in the data storage area to the in-vehicle apparatus. The in-vehicle apparatus is further configured to output the specific data when the in-vehicle apparatus has received the specific data from the portable device.

According to the above in-vehicle system, even when the vehicle is not within a communication service area (i.e., an area where the communication with the center apparatus is possible) or even when the vehicle is not within a strong radio signal receivable environment, the passenger of the vehicle can enjoy his or her desired service if the specific data specified by the data request had been previously distributed from the center apparatus and recorded in the portable device. Specifically, if the specific data specified by the data request had been previously distributed from the center apparatus and recorded in the cellular phone, the in-vehicle apparatus can receive and output the specific data stored in the portable device, and can provide the desired service to the passenger.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Figure 1:
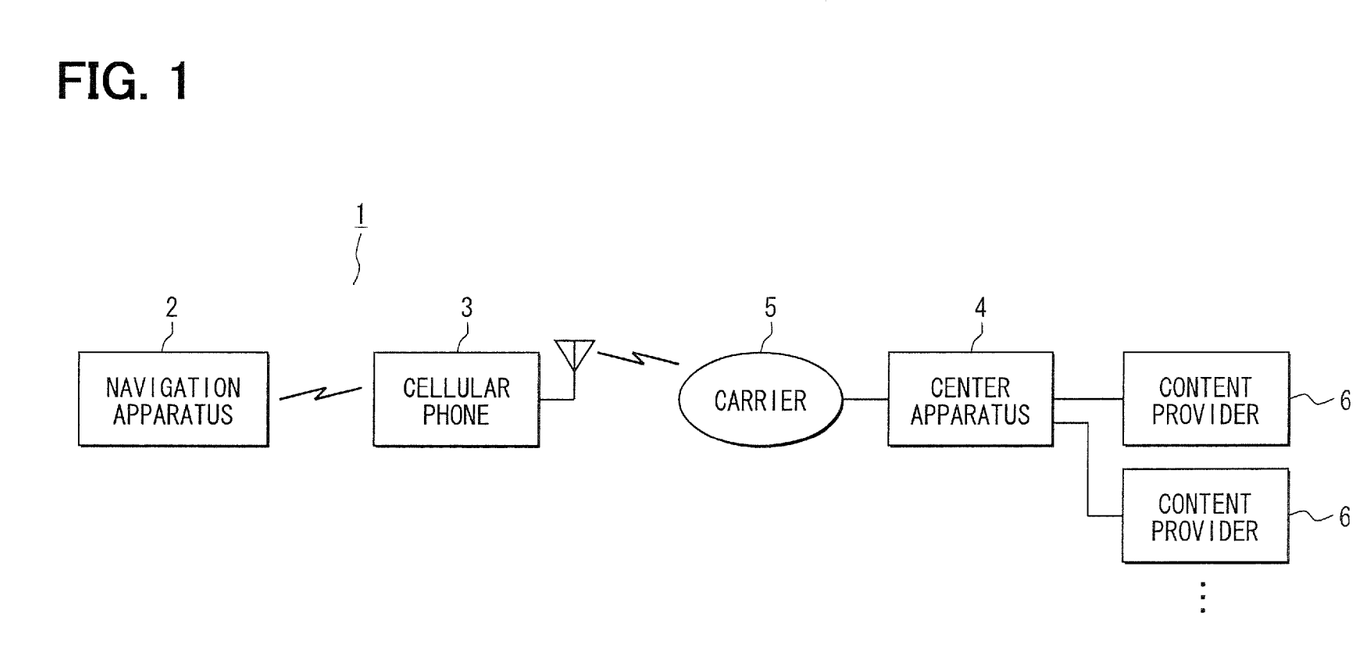
FIG. 1 is a diagram illustrating an in-vehicle communication system according to one embodiment.

Embodiments will be described with reference to the accompanying drawings. FIG. 1 illustrates an in-vehicle communication system 1 of one embodiment. The in-vehicle communication system 1 includes a vehicle navigation apparatus 2 and a cellular phone 3. The vehicle navigation apparatus 2 supports Bluetooth (registered trademark) and has a Bluetooth communication function. For simplicity, Bluetooth is abbreviated to hereinafter as BT. The vehicle navigation apparatus 2 is mounted to a vehicle and can act as an in-vehicle apparatus. The cellular phone 3 supports BT and has a BT communication function. The cellular phone 3 is capable of being carried by a passenger and can act as a portable device. When the cellular phone 3 is carried into the vehicle, the vehicle navigation apparatus 2 and the cellular phone 3 becomes communicable with each other.

In a state where the vehicle navigation apparatus 2 and the cellular phone 3 have a BT communication link therebetween, the vehicle navigation apparatus 2 and the cellular phone 3 are connectable with each other using one or more of multiple profiles defined in BT communications standards, e.g., a dial-up networking profile (DUP), a serial port profile (SPP) etc. The vehicle navigation apparatus 2 and the cellular phone 3 may be connected to each other simultaneously using multiple profiles (i.e., what is called a multi-profile connection). In the above, the profiles mean communication protocols that are defined on a function-by-function basis.

The cellular phone 3 is connectable with a center apparatus 4, which is provided in a center, via a wide area communication link through a communications carrier 5 (abbreviated to herein as a carrier 5). When the cellular phone 3 has the wide area communication link with the center apparatus 4, the cellular phone 3 can perform wide area communication with the center apparatus 4.

The center apparatus 4 is connected with multiple content service providers 6. When the center apparatus 4 has the wide communication link with the cellular phone 3, the center apparatus 4 can distribute data (e.g., content), which is provided from the content service provider 6, to the cellular phone 3 through the carrier 5 by the wide area communications. The data provided from the content service providers 6 may include, for example, news information, traffic information, weather information, travel information, map information, music information, entertainment information, or the like. The news information, the weather information or the like is real-time type data, which significantly varies with time. The map information or the like is an accumulation type data, which does not significantly vary with time.

Figure 2:
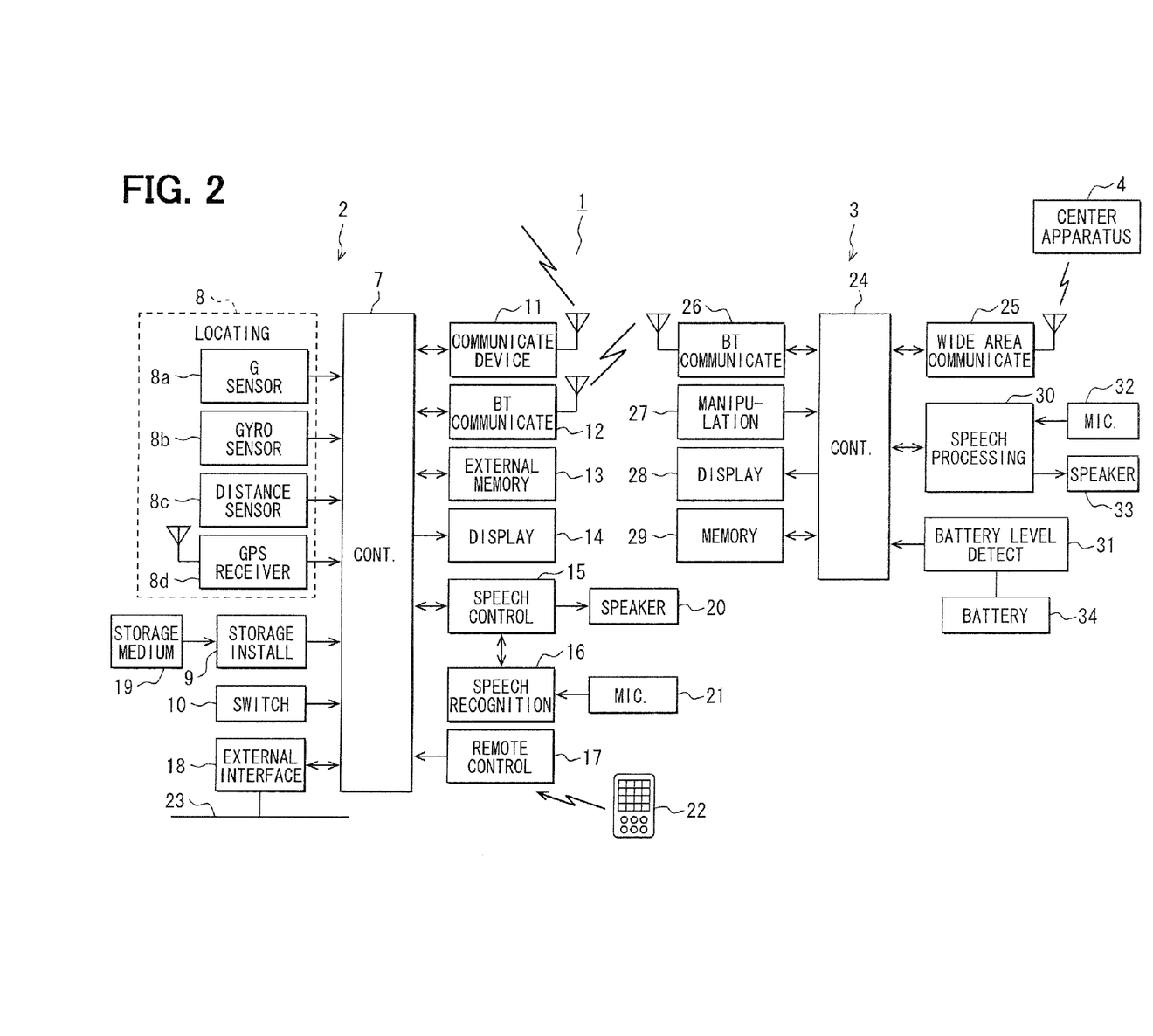
FIG. 2 is a functional block diagram illustrating a vehicle navigation apparatus and a cellular phone.

FIG. 2 is a functional block diagram illustrating the vehicle navigation apparatus 2 and the cellular phone 3. The vehicle navigation apparatus 2 includes a controller 7, a locating device 8, a storage medium installation part 9, a group of operation switches 10, a communication device 11, a BT communication part 12, an external memory 13, a display device 14, a speech controller 15, a speech recognition part 16, a remote control sensor 17, and an external device interface 18.

The controller 7, which may have a known a microcomputer, includes a CPU (central processing unit), a RAM (random access memory), and an I/O bus (input/output bus) etc. The controller 7 controls generally all of operations of the vehicle navigation apparatus 2 by executing control programs. The locating device 8 includes a G sensor 8a, a gyroscope 8b, a distance sensor 8c, and a GPS (global positioning system) receiver 8d. These components output detection signals and have detection errors that are different in property from each other. The controller 7 detects and identifies present position of the vehicle while compensating the detection signals each other. In connection with this, as long as the locating device 8 can detect the present position of the vehicle with a required detection accuracy, the locating device 8 needs not to include all of the above components. Further, the locating device 8 may detect the present position of the vehicle in combination with a steering wheel sensor for detecting steering angle of a steering wheel, a tire wheel sensor for detecting rotation of each tire wheel, or the like.

The storage medium installation part 9 installs a storage medium 19 such as a CD-ROM, a DVD-ROM, a memory card, a HDD and the like. The storage medium 19 stores map data, road data, mark data, data for map matching, or the like. The group of operation switches 10 includes a mechanical switch arranged in a periphery of the display device 14, and a touch-sensitive switch provided on the display device 14. In response to passenger's manipulation on any one of the switches, the group of operation switches 10 outputs a manipulation detection signal indicating content of the passenger's manipulation to the controller 7.

The communication device 11 performs wide area communication, e.g., receiving VICS (registered trade mark) information transmitted from a VICS apparatus. The VICS is abbreviation of Vehicle Information and Communication System. The BT communication part 12 can be connected with the cellular phone 3 via a BT communication link. When having the BT communication link, the BT communication part 12 can perform BT communication with the cellular phone 3. The external memory 13 includes a large-capacity storage device such as a HDD and the like, which can store a large amount of data. The display device 14 includes, for example, a liquid crystal display. The display device 14 presents various displays such as a menu screen, a destination setting screen and the like. The display device 14 superimposes a present position mark indicating the present position of the vehicle, a vehicular swept path or the like on a map based on the map data. The display device 14 may include an organic light emitting display, a plasma display or the like.

The speech controller 15 controls an operation of the speech recognition part 16. The speech controller 15 controls a speech output from a speaker 20, such as route guidance, a warning guidance and the like. The speech recognition part 16 performs speech recognition on speech received with a microphone 21 according to a speech recognition algorithm. The remote control sensor 17 receives a manipulation detection signal transmitted from a remote control 22, thereby detecting content of a passenger's manipulation on the remote control 22. The remote control sensor 17 outputs a manipulation detection signal indicting the content of the manipulation to the controller 7. The external device interface 18 is connected with various on-board ECUs (electronic control unit) and various on-board sensors via an in-vehicle LAN 23. Various signals and various data are inputted and outputted between the external device interface 18 and the various ECUs, and between the external device interface 18 and the various sensors.

The controller 7 implements various navigation functions such as a map matching function, a route retrieval function, a route guidance function, and a drawing function etc. The map matching function is provided to identify a road on which the present position of the vehicle exists by using the present position of the vehicle and the road data of the map data. The route retrieval function is provided to retrieve a route from the present position of the vehicle, which may be identified by map matching, to a destination, which may be set by the passenger. The route guidance function is provided to perform route guidance by calculating guidance points based on the retrieved route, the road data, intersection position data and the like. In the above, the guidance points are points for use in the route guidance. The road data and the intersection position data are contained in the map data. The drawing function is provide to draw a map around the present position of the vehicle, a simplified map of expressways, a magnified view of an intersection and its surroundings, and the like.

The cellular phone 3 includes a controller 24, a wide area communication part 25, a BT communication part 26, a manipulation part 27, a display device 28, a memory 29, a speech processing part 30, and a remaining battery level detector 31. The controller 24, which may have a known microcomputer, includes a CPU, a RAM, a ROM, an I/O bus and the like. The controller 24 controls generally all of operations of the cellular phone 3 by executing control programs. The wide area communication part 25 can be connected with a center apparatus 4 via a wide area communication link. When having the wide area communication link, the wide area communication part 25 performs wide area communication with the center apparatus 4. The BT communication part 26 can be connected with the vehicle navigation apparatus 2 via a BT communication link. When having the BT communication link, the BT communication part 26 performs the BT communication with the vehicle navigation apparatus 2.

The manipulation part 27 includes various keys such as a power key, numeric keys "1" to "9", and the like. In response to passenger's manipulation on any one of the keys, the manipulation part 27 outputs a manipulation detection signal indicating content of the passenger's manipulation to the controller 24. The display device 28 includes, for example, a liquid crystal display. The display device 28 presents various displays such as a standby display, an incoming notification display and the like. The memory 29 has a data storage area for storing various data, e.g., a phone data indicating a relationship between phone numbers and registered names. The memory 29 further has another data storage area for storing various data, e.g., a data which the wide area communication part 25 has received from the center apparatus 4.

The speech processing part 30 is connected with a microphone 32 and a speaker 33. The microphone 32 can receive a user spoken speech as an outgoing speech. The speaker 33 can output an incoming speech coming from a conversation counterpart. The speech processing part 30 performs an outgoing speech operation through processing on the user spoken speech inputted from the microphone 32. The speech processing part 30 further performs an incoming speech operation through processing on the incoming speech, which is to be outputted from the speaker 33. The battery remaining level detector 31 detects a remaining battery level of a battery 34, which serves as a power source for operation of the cellular phone 3. The battery remaining level detector 31 outputs a battery level signal indicating the detected remaining battery level of the battery 34 to the controller 24.

Figure 3:
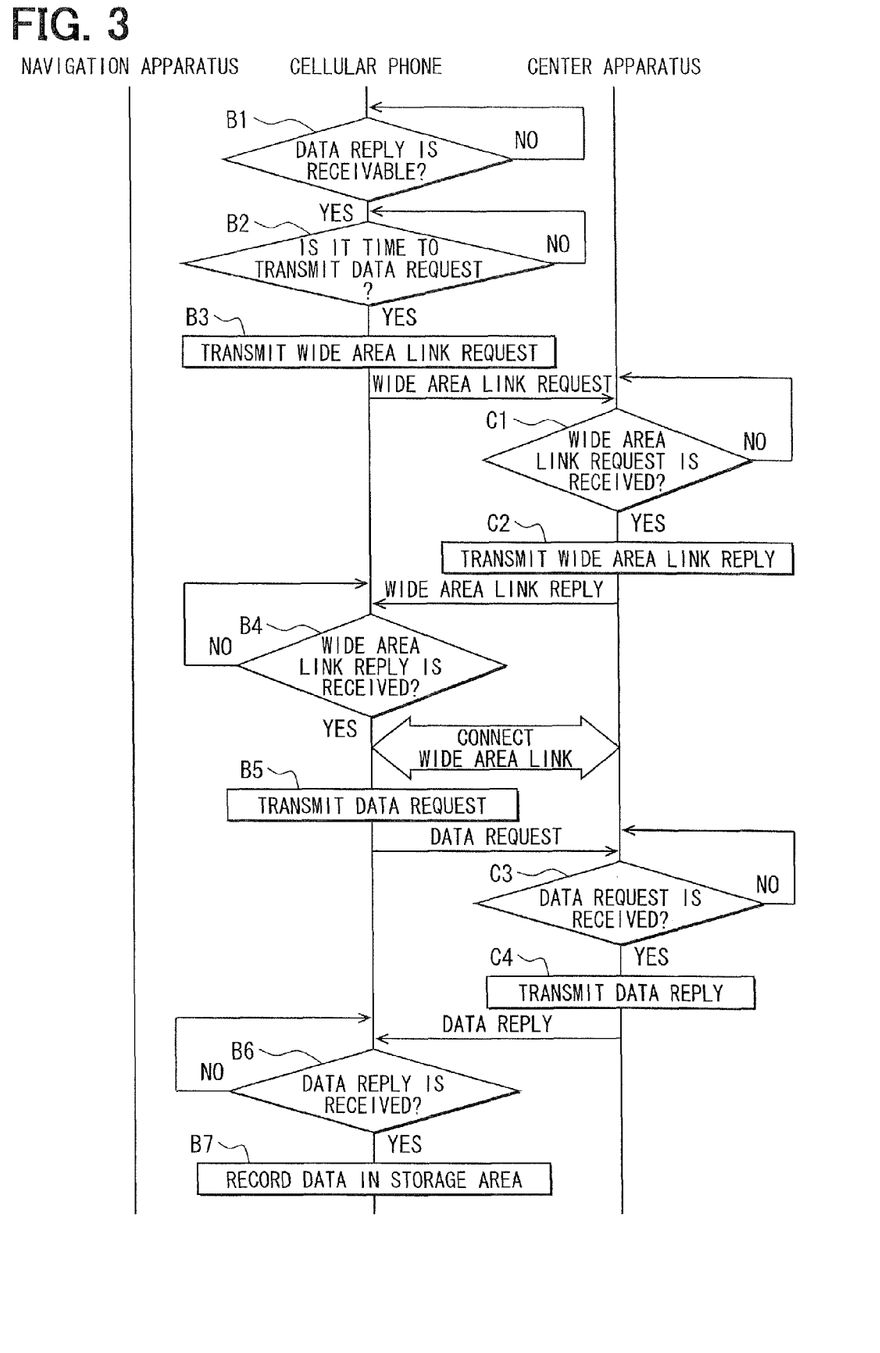
FIG. 3 is a sequence diagram illustrating a first exemplary flow of processes of an in-vehicle communication system

Operation of the in-vehicle communication system 1 associated with the above-described configuration will be described with reference to FIGS. 3 to 7. FIG. 3 is a sequence diagram illustrating a first exemplary flow of processes of the in-vehicle communication system 1. As shown in FIG. 3, at B1, the controller 24 of the cellular phone 3 determines whether the cellular phone 3 is within a wide area communication service area and within a strong radio signal receivable environment, i.e., the controller 24 determines whether the cellular phone 3 can receive a data reply transmitted from the center apparatus 4. To make the above determination, the controller 24 determines, for example, whether signal strength (i.e., electric field strength) of a received radio wave at the wide area communication part 25 is greater than or equal to a threshold. At predetermine time intervals, the controller 24 may make the determination as to whether the cellular phone 3 can receive the data reply transmitted from the center apparatus 4. When the controller 24 determines that the cellular phone 3 cannot receive the data reply transmitted from the center apparatus 4, corresponding to "NO" at B1, the process B1 is repeated. When the controller 24 determines that the signal strength of the received radio wave at the wide area communication part 25 is greater than or equal to the threshold for example, the controller 24 determines that the cellular phone 3 can receive the data reply transmitted from the center apparatus 4. In this case, the determination at B1 results in "YES", and the process proceeds to B2. At B2, based on predetermined timing of transmitting a data request specifying a specific data (e.g., specific content), the controller 24 determines whether it is time to transmit the data request. When the controller 24 determines that it is not time to transmit the data request, corresponding to "NO" at B2, the process B2 is repeated. When the controller 24 determines that it is time to transmit the data request, corresponding to "YES" at B2, the process proceeds to B3. At B3, the controller 24 causes the wide area communication part 25 to transmit a wide area communication link connection request to the center apparatus 4. At B4, the controller 24 waits for reception of a wide area communication link connection reply. In connection with the B1 and B2, the controller 24 may perform B2 before B1. That is, after determining that it is time to transmit the data request, the controller 24 may determine whether the cellular phone 3 can receive the data reply transmitted from the center apparatus 4.

At C1, the center apparatus 4 determines whether the center apparatus 4 has received the wide area communication link connection request from the cellular phone 3. When the center apparatus 4 determines that the center apparatus 4 has not received the wide area communication link connection request from the cellular phone 3, corresponding to "NO" at C1, the process C1 is repeated. When the center apparatus 4 determines that the center apparatus 4 has received the wide area communication link connection request from the cellular phone 3, corresponding to "YES" at C1, the process proceeds to C2. At C2, the center apparatus 4 determines whether the center apparatus 4 can establish a wide area communication link with the cellular phone 3 from which the wide area communication link connection request has been transmitted. When the center apparatus 4 determines that the center apparatus 4 can establish the wide area communication link with the cellular phone 3, the center apparatus 4 transmits a wide area communication link connection reply to the cellular phone 3.

Then, at B4, the controller 24 determines whether the cellular phone 3 had received the wide area communication link connection reply from the center apparatus 4. When the controller 24 of the cellular phone 3 determines that the cellular phone 3 has not received the wide area communication link connection reply from the center apparatus 4, corresponding to "NO" at B4, the process B4 is repeated. When the controller 24 of the cellular phone 3 determines that the cellular phone 3 has received the wide area communication link connection reply from the center apparatus 4, corresponding to "YES" at B4, a wide area communication link connection process is performed to establish the wide area communication link between the wide area communication part 25 and the center apparatus 4. At B5, the controller 24 causes the wide area communication part 25 to transmit the data request to the center apparatus 4. At B6, the controller 24 waits for reception of a data reply from the center apparatus 4.

At C3, the center apparatus 4 determines whether the center apparatus 4 has received the data request from the cellular phone 3. When the center apparatus 4 determines that the center apparatus 4 has not received the data request from the cellular phone 3, corresponding to "NO" at C3, the process C3 is repeated. When the center apparatus 4 determines that the center apparatus 4 has received the data request from the cellular phone, corresponding to "YES" at C3, the process proceeds to C4. At C4, from the content service providers 6, the center apparatus 4 acquires the specific data (specific content) specified by the received data request, and then the center apparatus 4 transmits the data reply containing the acquired specific data to the cellular phone 3. For example, if the specific data specified by the data request is a data about news, the center apparatus 4 acquires news information from a content service provider 6 providing news information, and transmits the data reply containing the acquired news information as the specific data to the cellular phone 3.

At B6, the controller 24 of the cellular phone 3 determines whether the wide area communication part 25 has received the data reply from the center apparatus 4. When the controller 24 of the cellular phone 3 determines that the wide area communication part 25 has not received the data reply from the center apparatus 4, corresponding to "NO" at B6, the process B6 is repeated. When the controller 24 of the cellular phone 3 determines that the wide area communication part 25 has received the data reply from the center apparatus 4, corresponding to "YES" at B6, the process proceeds to B7. At B7, in the data storage area of the memory 29, the controller 24 records the specific data contained in the received data reply.

According to the above series of processes, when it is time for the cellular phone 3 to transmit the data request in a state where the cellular phone 3 can receive the data reply from the center apparatus 4, the cellular phone 3 transmits the data request and receives a data distributed from the center apparatus 4 and records the received data in the data storage area of the memory 29. In the above, the data request transmitted from the cellular phone 3 to the center apparatus 4 specifies a specific data that is requested to be distributed from the center apparatus 4 to the cellular phone 3. Such a specific data may be previously set by a passenger. Alternatively, a history of passenger's access to data may be stored as an access history, and the specific data may be determined based on the access history. For example, the specific data may be set so that the specific data is similar to a data that the passenger has accessed frequently.

Now, let us consider a situation where the cellular phone 3 is carried into a vehicle compartment, and the vehicle navigation apparatus 2 and the cellular phone 3 are placed within a BT communication range and are communicable with each other by BT communication. Then, the vehicle navigation apparatus 2 and the cellular phone 3 transmit a BT communication link connection request and a BT communication link connection reply, and perform a BT communication link connection process to connect a BT communication link therebetween. In the above, the connection of the BT communication link may be requested from either the vehicle navigation apparatus 2 or the cellular phone 3. That is, the vehicle navigation apparatus 2 may transmit the BT communication link connection request and then the cellular phone 3 may transmit the BT communication link connection reply. Alternatively, the cellular phone 3 may transmit the BT communication link connection request and then the vehicle navigation apparatus 2 may transmit the BT communication link connection reply.

When the vehicle navigation apparatus 2 and the cellular phone 3 are connected with each other via the BT communication link, a passenger can control the cellular phone 3 by manipulating the group of operation switches 10 of the vehicle navigation apparatus 2 or the remote control 22. For example, a phone number list (phone book) registered in the cellular phone 3 is transferred to the vehicle navigation apparatus 2 and displayed on the display device 14 of the vehicle navigation apparatus 2, so that a user can operate the phone number list displayed on the display device 14 of the vehicle navigation apparatus 2. Furthermore, a touch-sensitive switch acting as a call button is provided on the display device 14 of the vehicle navigation apparatus 2, so that the passenger can press the call button to make a phone call from the cellular phone 3.

Figure 4:
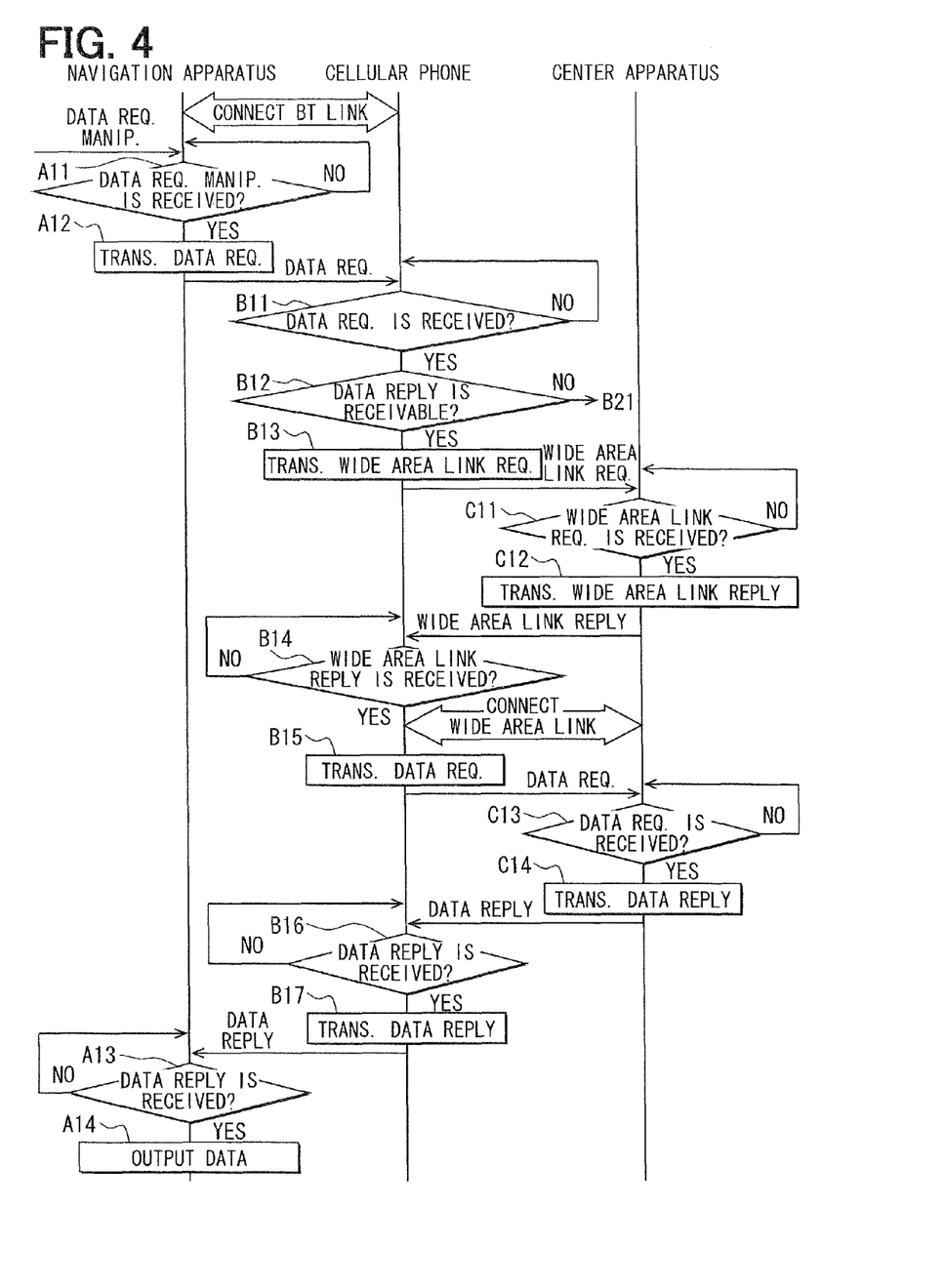
FIG. 4 is a sequence diagram illustrating a second exemplary flow of processes of an in-vehicle communication system

Operation of the in-vehicle communication system 1 associated with the above-described configuration will be described with reference to FIG. 4. FIG. 4 is a sequence diagram illustrating a second exemplary flow of processes of the in-vehicle communication system 1. As shown in FIG. 4, when the BT communication part 12 of the vehicle navigation apparatus 2 and the BT communication part 26 of the cellular phone 3 establish a BT communication link therebetween, the vehicle navigation apparatus 2 performs the following. At A11, the controller 7 of the vehicle navigation apparatus 2 determines whether or not the vehicle navigation apparatus 2 has received a data request from the passenger via the passenger's manipulation on the group of operation switches 10 or the remote control 22. When it is determined that the vehicle navigation apparatus 2 has not received the data request from the passenger, corresponding to "NO" at A11, the processes A11 is repeated. When it is determined that the vehicle navigation apparatus 2 has received the data request from the passenger, corresponding to "YES" at A11, the processes proceeds to A12. At A12, the controller 7 causes the BT communication part 12 to transmit the data request to the cellular phone 3.

At B11, the controller 24 of the cellular phone 3 determines whether the BT communication part 26 has received the data request from the vehicle navigation apparatus 2. When the controller 24 of the cellular phone 3 determines that the BT communication part 26 has not received the data request from the vehicle navigation apparatus 2, corresponding to "NO" at B11, the process B11 is repeated. When the controller 24 of the cellular phone 3 determines that the BT communication part 26 has received the data request from the vehicle navigation apparatus 2, corresponding to "YES" at B11, the process proceeds to B12. At B12, the controller 24 of the cellular phone 3 determines whether the cellular phone 3 or the vehicle is within the wide area communication service area and the strong radio signal receivable environment, i.e., the controller 24 determines whether the cellular phone 3 can receive the data reply transmitted from the center apparatus 4. To make the above determination, the controller 24 determines, for example, whether the signal strength (i.e., electric field strength) of the received radio wave at the wide area communication part 25 is greater than or equal to the threshold. When it is determined determining that, for example, the signal strength (i.e., electric field strength) of the received radio wave at the wide area communication part 25 is greater than or equal to the threshold, the controller 24 determines that the cellular phone 3 can receive the data reply transmitted from the center apparatus 4, corresponding to "YES" at B12. In this case, the process proceeds to B13. At B13, the controller 24 causes the wide area communication part 25 to transmit the wide area communication link connection request to the center apparatus 4. Then, at B14, the controller 24 waits for reception of the wide area communication link connection reply from the center apparatus 4.

At C11, the center apparatus 4 determines whether the center apparatus 4 has received the wide area communication link connection request from the cellular phone 3. When the center apparatus 4 determines that the center apparatus 4 has not received the wide area communication link connection request from the cellular phone 3, corresponding to "NO" at C11, the process C11 is repeated. When the center apparatus 4 determines that the center apparatus 4 has received the wide area communication link connection request from the cellular phone 3, corresponding to "YES" at C11, the process proceeds to C12. At C12, the center apparatus 4 determines whether the center apparatus 4 can establish a wide area communication link with the cellular phone 3, which has transmitted the wide area communication link connection request. When the center apparatus 4 determines that the center apparatus 4 can establish a wide area communication link with the cellular phone 3, the center apparatus 4 transmits the wide area communication link connection reply to the cellular phone 3. When the center apparatus 4 determines that the center apparatus 4 cannot establish a wide area communication link with the cellular phone 3, the center apparatus 4 may transmit information indicating that the wide area communication link cannot be established.

Then, at B14, the controller 24 of the cellular phone 3 determines whether the wide area communication part 25 has received the wide area communication link connection reply from the center apparatus 4. When the controller 24 of the cellular phone 3 determines that the wide area communication part 25 has not received the wide area communication link connection reply from the center apparatus 4, corresponding to "NO" at B14, the process B14 is repeated to wait for reception of the wide area communication link connection reply. When the controller 24 of the cellular phone 3 determines that the wide area communication part 25 has received the wide area communication link connection reply from the center apparatus 4, corresponding to "YES" at B14, a wide area communication link connection process is performed to establish the wide area communication link between the wide area communication part 25 and the center apparatus 4. When the wide area communication link is established between the wide area communication part 25 and the center apparatus 4, the process proceeds to B15. At B15, the controller 24 causes the wide area communication part 25 to transmit the data request to the center apparatus 4. At B16, the controller 24 waits for reception of the data reply from the center apparatus 4.

At C14, the center apparatus 4 determines whether the center apparatus 4 has received the data request from the cellular phone 3. When the center apparatus 4 determines that the center apparatus 4 has not received the data request from the cellular phone 3, corresponding to "NO" at C13, the process C13 is repeated to wait for reception of the data request. When the center apparatus 4 determines that the center apparatus 4 has received the data request from the cellular phone 3, corresponding to "YES" at C13, the process proceeds to C14. At C14, the center apparatus 4 acquires a specific data (specific content), which is specified by the data request, from the content service provider 6 and transmits a data replay containing the acquired specific data to the cellular phone 3.

At B16, the controller 24 of the cellular phone 3 determines whether the cellular phone 3 has received the data reply transmitted from the center apparatus 4. When the controller 24 of the cellular phone 3 determines that the cellular phone 3 has not received the data reply transmitted from the center apparatus 4, corresponding to "NO" at B16, the process B16 is repeated to wait for reception of the data reply. When the controller 24 of the cellular phone 3 determines that the cellular phone 3 has received the data reply transmitted from the center apparatus 4, corresponding to "YES" at B16, the process proceeds to B17. At B17, the controller 24 causes the BT communication part 26 to transmit the received reply data to the vehicle navigation apparatus 2.

Figure 6:
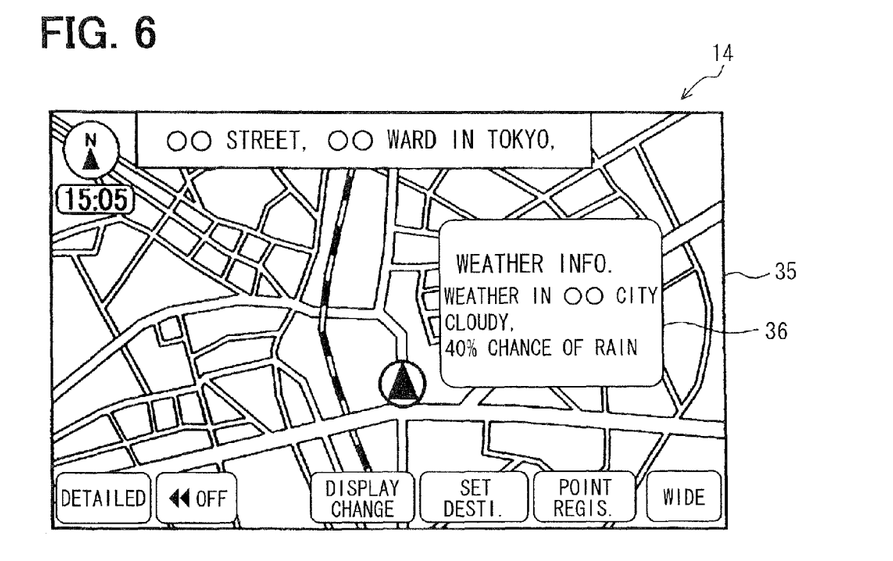
FIG. 6 is a diagram illustrating a first exemplary display.

At A13, the controller 7 of the vehicle navigation apparatus 2 determines whether the BT communication part 12 of the vehicle navigation apparatus 2 has received the data reply from the cellular phone 3. When the controller 7 determines that the BT communication part 12 has not received the data reply from the cellular phone 3, corresponding to "NO" at A13, the process A13 is repeated to wait for reception of the data reply. When the controller 7 determines that the BT communication part 12 has received the data reply from the cellular phone 3, corresponding to "YES" at A13, the process proceeds to A14. At A14, the controller 7 extracts the specific data from the received data reply, and may cause the display device 14 to display a display screen or the speaker 20 to output a sound based on the extracted specific data. An example of outputting the specific data is shown in FIG. 6. In FIG. 6, the display device 14 displays a present position displaying screen 35, in which a present position mark indicating the present position of the vehicle is superimposed on a map made based on the map data. Moreover, a weather information window 36 is put up on the present position displaying screen 35 so that the weather information window 36 presents the weather information that is acquired from the center apparatus 4 via the cellular phone 3. In the above, the controller 7 pops up the weather information window 36 on the present position displaying screen 35 if a data about weather information is requested by the passenger via a passenger's manipulation on the group of operation switches 10 or the remote control 22.

Figure 5:
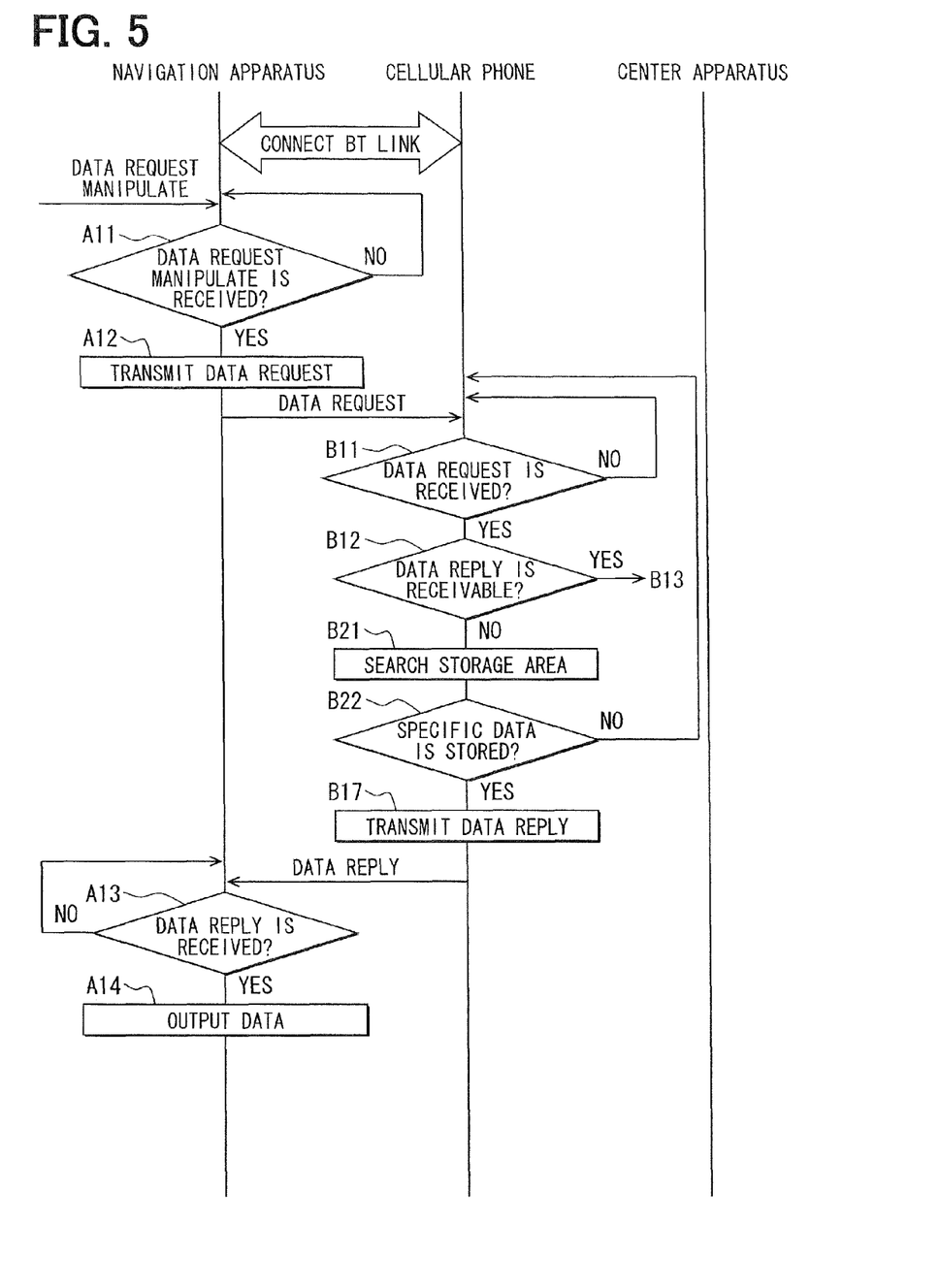
FIG. 5 is a sequence diagram illustrating a third exemplary flow of processes of an in-vehicle communication system

Now, let us consider a situation where the controller 24 determines that the cellular phone 3 cannot receive the data reply from the center apparatus 4, by determining that the signal strength of the received radio wave at the wide area communication part 25 is not greater than or equal to the threshold for instance. This situation corresponds to "NO" at B12 in FIG. 5. In the following, processes to be performed after "NO" at B12 will be described with reference to FIG. 5. After "NO" at B12, the process proceeds to B21, as shown in FIG. 5. At B21, the controller 24 searches the data storage area of the memory 29. At B22, the controller 24 determines whether the specific data specified by the received data request is stored in the data storage area of the memory 29. When the controller 24 determines that the specific data specified by the received data request is stored in the data storage area of the memory 29, corresponding to "YES" at B22, the process proceeds to B17. At B17, the controller 24 causes the BT communication part 26 to transmit a data reply containing the stored specific data to the vehicle navigation apparatus 2. When the controller 24 determines that the specific data specified by the received data request is not stored in the data storage area of the memory 29, corresponding to "NO" at B22, the controller 24 may notify the vehicle navigation apparatus of information indicating that the specific data specified by the data request cannot be acquired from the center apparatus 4 and is not stored in the cellular phone 3.

When the controller 7 of the vehicle navigation apparatus 2 determines that the BT communication part 12 of the vehicle navigation apparatus 2 has received the data reply from the cellular phone 3, corresponding to "YES" at A13, the controller 7 extracts the specific data from the received data reply, and may cause the display device 14 to display a display screen or the speaker 20 to output a sound based on the extracted specific data.

According to the above series of processes, when the vehicle navigation apparatus 2 has received a passenger's manipulation instructing a data request, and when the cellular phone 3 can receive a data reply from the center apparatus 4, the cellular phone 3 receives the specific data specified by the data request from the center apparatus 4 and transmits the received specific data to the vehicle navigation apparatus 2; thereby, the specific data is outputted from the vehicle navigation apparatus 2. In contrast, when the cellular phone 3 cannot receive a data reply from the center apparatus 4, it is determined whether the specific data specified by the data request is stored in the cellular phone 3, that is, it is determined whether the specific data specified by the data request had been previously received from the center apparatus 4 and recorded in the cellular phone 3. When it is determined that the specific data specified by the data request had been previously received from the center apparatus 4 and recorded in the cellular phone 3, the stored specific data is transmitted to the vehicle navigation apparatus 2; thereby, the specific data is outputted from the vehicle navigation apparatus 2.

Figure 7:
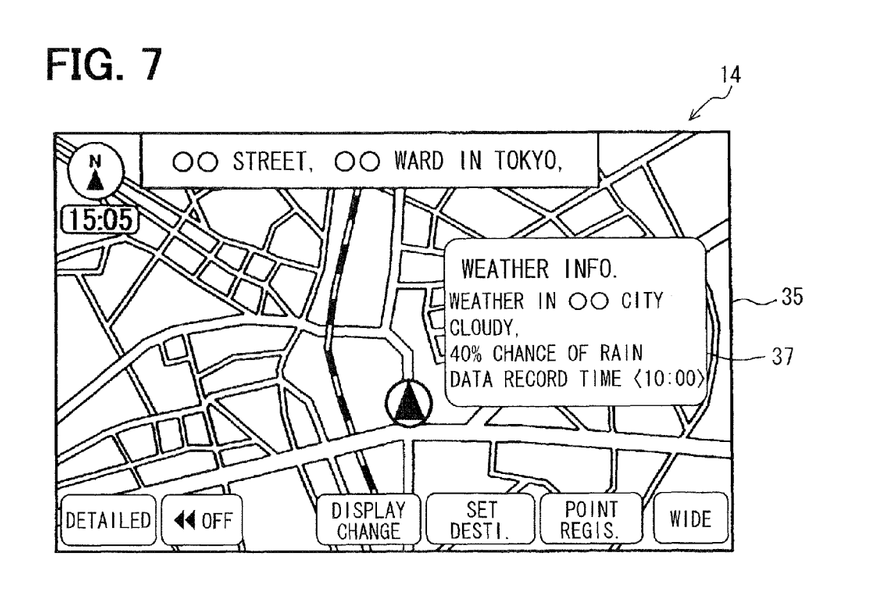
FIG. 7 is a diagram illustrating a second exemplary display.

When the specific data previously distributed from the center apparatus 2 and previously recorded in the cellular phone 3 is outputted from the vehicle navigation apparatus 2 because the cellular phone 3 cannot receive the data reply from the center apparatus 4, the controller 7 of the vehicle navigation apparatus 2 may further output a time (time stamp) when the specific data was recorded in the cellular phone 3. That is, when the cellular phone 3 determines that the cellular phone 3 cannot receive, from the center apparatus 4, the data reply containing the specific data specified by the data request, and when the cellular phone 3 determines that the specific data specified by the data request is stored in the data storage area of the cellular phone 3, the cellular phone 3 may transmit the specific data stored in the data storage area to the vehicle navigation apparatus 2 and further transmits time information to the vehicle navigation apparatus 2, the time information relating to a time when the specific data was recorded in the data storage area of the cellular phone 3; thereby, the vehicle navigation apparatus 2 outputs the specific data together with the time information. An example of outputting time information is shown in FIG. 7. In FIG. 7, the display device 14 displays the present position displaying screen 35. Moreover, the display device 14 puts up a weather information window 37 on the present position displaying screen 35 so that the weather information window 37 presents weather information together with a time when a data about the weather information was recorded in the cellular phone 3 (see the data record time "10:00" in FIG. 7). In the above, the controller 7 pops up the weather information window 37 on the present position displaying screen 35 if a data about weather information is requested by the passenger via a passenger's manipulation on the group of operation switches 10 or the remote control 22.

As can be seen from the above explanation on the present embodiment, the in-vehicle communication system 1 is configured to operate in the following manner. When the vehicle navigation apparatus 2 and the cellular phone 3 have the BT communication link therebetween, the vehicle navigation apparatus 2 may receive a passenger manipulation relating to a data request. In this case, there is a possibility that the cellular phone 3 cannot receive a data reply from the center apparatus 4 depending on whether the cellular phone 3 is within or outside a communication service area. However, even in this case, if the specific data specified by the data request is stored in the cellular phone 3, the specific data stored in the cellular phone 3 is outputted from the vehicle navigation apparatus 2. Therefore, even if the vehicle is outside a communication service area (an area where the communication with the center apparatus 4 is possible), or even if the vehicle is within the communication service area but within a weak radio signal environment, it is possible to output the data that had been previously distributed form the center apparatus 4 and recorded in the cellular phone 3. Therefore, a passenger can appropriately enjoy his or her desired service.

In particular, since the BT communication link between the vehicle navigation apparatus 2 and the cellular phone 3 allows a passenger to control the cellular phone 3 by manipulating the vehicle navigation apparatus 2, it is conceivable that the passenger may mainly manipulate the vehicle navigation apparatus 2 and may rarely manipulate the cellular phone 3. Thus, the passenger may pay no attention to whether the cellular phone is within a communication service area. From this viewpoint, it is a significant advantage to previously record the data distributed from the center apparatus 4 in the cellular phone 3, so that the data can be outputted from the vehicle navigation apparatus 2 regardless of whether the cellular phone is within a communication service area.

The above embodiment can be modified or extended in various ways, examples of which will be described below. As long as the in-vehicle apparatus can communicate with a cellular phone, the in-vehicle apparatus is not limited to a vehicle navigation apparatus, and may have a function other than the vehicle navigation apparatus. As long as the portable device can communicate with the in-vehicle apparatus and the center apparatus, the portable device is not limited to a cellular phone, and may have a function other than the cellular phone. A short range wireless communication between the vehicle navigation apparatus and the cellular phone is not limited to a BT communication and may be another short range wireless communication. Alternatively, the vehicle navigation apparatus and the cellular phone may perform a wire communication therebetween.

According to an example of the present disclosure, the following in-vehicle system can be provided. The in-vehicle communication system includes an in-vehicle apparatus mounted to a vehicle and a portable device capable of being carried by a passenger. The in-vehicle apparatus and the portable device are configured to be communicable with each other. The portable device is further configured to be communicable with a center apparatus. The portable device includes a data storage area for storing information received from the center apparatus. The portable device is further configured such that when the portable device has received a data request specifying a specific data from the in-vehicle apparatus, the portable device determines whether the portable device can receive, from the center apparatus, a data reply containing the specific data specified by the data request. The portable device is further configured such that when the portable device determines that the portable device cannot receive, from the center apparatus, the data reply containing the specific data specified by the data request, and when the portable device determines that the specific data specified by the data request is stored in the data storage area of the portable device, the portable device transmits the specific data stored in the data storage area to the in-vehicle apparatus. The in-vehicle apparatus is further configured to output the specific data when the in-vehicle apparatus has received the specific data from the portable device.

According the above in-vehicle system, even when the vehicle is outside a communication service area (where the communication with the center apparatus is possible) or even when the vehicle is not within a strong radio signal receivable environment, the passenger of the vehicle can enjoy his or her desired service if the specific data specified by the data request had been previously distributed from the center apparatus and recorded in the portable device. Specifically, if the specific data specified by the data request had been previously distributed from the center apparatus and recorded in the cellular phone, the in-vehicle apparatus can receive and outputs the specific data stored in the portable device, and provide the desired service to the passenger.

The above in-vehicle communication system may be configured in the following way. When the portable device determines that the portable device cannot receive, from the center apparatus, the data reply containing the specific data specified by the data request, and when the portable device determines that the specific data specified by the data request is stored in the data storage area of the portable device, the portable device transmits the specific data stored in the data storage area to the in-vehicle apparatus and further transmits time information to the in-vehicle apparatus, the time information relating to a time when the specific data was recorded in the data storage area of the portable device.

According to the above configuration, the in-vehicle apparatus can output the time when the specific data distributed from the center apparatus was recorded in the portable device. Thus, the in-vehicle apparatus can notify the passenger of the time when the specific data was recorded in the portable device. Therefore, the in-vehicle apparatus can notify the passenger of reliability of the specific data. In other words, when a time difference between the present time and the time when the specific data distributed from the center apparatus was recorded in the portable device is relatively large, the in-vehicle apparatus can notify the passenger that the reliability of the specific data is relatively low or the specific data is old. In contrast, when the time difference between the present time and the time when the specific data distributed from the center apparatus was recorded in the portable device is relatively small, the in-vehicle apparatus can notify the passenger that the reliability of the specific data is relatively high or the specific data is new.

The above in-vehicle communication system may be configured in the following way. When the portable device determines that the portable device can receive, from the center apparatus, the data reply containing the specific data specified by the data request, the portable device transmits the data request to the center apparatus. According to this configuration, when the vehicle is within the communication service area for communication with the center apparatus and the vehicle is within the strong radio signal receivable environment, the in-vehicle apparatus can receive and output a latest data distributed from the center apparatus by transmission of the data request.

While the invention has been described above with reference to various embodiments thereof, it is to be understood that the invention is not limited to the above described embodiments and constructions. The invention is intended to cover various modifications and equivalent arrangements.

What is claimed is:

1. An in-vehicle communication system comprising:
an in-vehicle apparatus mounted to a vehicle; and
a portable device capable of being carried by a passenger, wherein:
the in-vehicle apparatus and the portable device are configured to be directly communicable with each other at least when the portable device is carried into the vehicle;
the portable device is further configured to be communicable with a center apparatus;
the portable device includes a data storage area for storing information received from the center apparatus;
when the portable device receives from the in-vehicle apparatus, through direct communication with the in-vehicle apparatus, a data request specifying a specific data, the portable device determines whether the portable device is capable of receiving, from the center apparatus, a data reply containing the specific data specified by the data request;
when the portable device determines that the portable device is capable of receiving the data reply containing the specific data from the center apparatus,
the portable device receives the data reply containing the specific data from the center apparatus through communication with the center apparatus, and transmits the data reply containing the specific data to the in-vehicle apparatus, by direct communication with the in-vehicle apparatus, such that the in-vehicle apparatus receives the specific data from the center apparatus via the portable device and outputs the specific data;
when the portable device determines (i) that the portable device is not capable of receiving, from the center apparatus, the data reply containing the specific data specified by the data request, and (ii) that the specific data specified by the data request was received from the center apparatus and recorded in the data storage area of the portable device before the portable device had been carried into the vehicle,
the portable device transmits the specific data stored in the data storage area to the in-vehicle apparatus through direct communication with the in-vehicle apparatus, and the in-vehicle apparatus outputs the specific data when the in-vehicle apparatus receives the specific data from the portable device.

2. The in-vehicle communication system according to claim 1, wherein:
when the portable device determines that the portable device is capable of receiving, from the center apparatus, the data reply containing the specific data specified by the data request,
the portable device transmits the data request to the center apparatus.

3. The in-vehicle communication system according to claim 1, wherein:
when the portable device in the vehicle determines, upon receipt of the data request from the in-vehicle apparatus, that (i) the portable device is not capable of receiving, from the center apparatus, the data reply containing the specific data specified by the data request and (ii) the specific data specified by the data request was received from the center apparatus and recorded in the data storage area of the portable device before the portable device had been carried into the vehicle,
the portable device further transmits, to the in-vehicle apparatus, a time information indicating a time when the specific data was recorded in the storage area of the portable device, and
the in-vehicle apparatus outputs, upon receipt of the time information from the portable device, the time indicated by the time information.

4. The in-vehicle communication system according to claim 1, wherein:
the specific data, which the portable device receives from the center apparatus and transmits to the in-vehicle apparatus, is content provided by a content service provider.

5. The in-vehicle communication system according to claim 3, wherein:
the specific data, which the portable device receives from the center apparatus and transmits to the in-vehicle apparatus, is content provided by a content service provider.

6. The in-vehicle communication system according to claim 4, wherein:
the content, which the portable device receives from the center apparatus and transmits to the in-vehicle apparatus, includes news information or weather information.

7. The in-vehicle communication system according to claim 5, wherein:
the content, which the portable device receives from the center apparatus and transmits to the in-vehicle apparatus, includes news information or weather information.

8. The in-vehicle communication system according to claim 1, wherein:
the in-vehicle apparatus and the portable device directly communicate with each other by Bluetooth communication.

* * * * *